US008135338B1

(12) United States Patent
Gelon et al.

(10) Patent No.: US 8,135,338 B1
(45) Date of Patent: Mar. 13, 2012

(54) SATELLITE SYSTEM WITH ENHANCED PAYLOAD CAPACITY

(75) Inventors: Walter Gelon, Redwood City, CA (US); William Nations, Placerville, CA (US); Douglas Burr, San Jose, CA (US)

(73) Assignee: Space Systems/Loral, Inc., Palo Alto, CA (US)

( * ) Notice: Subject to any disclaimer, the term of this patent is extended or adjusted under 35 U.S.C. 154(b) by 488 days.

(21) Appl. No.: 12/344,064

(22) Filed: Dec. 24, 2008

(51) Int. Cl.
*H04B 7/185* (2006.01)

(52) U.S. Cl. ...................................... 455/13.1; 455/13.2

(58) Field of Classification Search .................. 455/13.1, 455/13.2, 13.3, 427, 428
See application file for complete search history.

(56) References Cited

U.S. PATENT DOCUMENTS

| | | | |
|---|---|---|---|
| 5,561,838 | A | 10/1996 | Chandos et al. |
| 6,078,810 | A | 6/2000 | Olds et al. |
| 6,122,499 | A | 9/2000 | Magnusson |
| 6,292,659 | B1 | 9/2001 | Olds et al. |
| 6,336,030 | B2 * | 1/2002 | Houston et al. .............. 455/13.2 |
| 6,449,263 | B2 | 9/2002 | Harris et al. |
| 6,985,455 | B1 * | 1/2006 | Heath et al. .................... 370/316 |
| 2006/0167597 | A1 * | 7/2006 | Bodin et al. ...................... 701/3 |

OTHER PUBLICATIONS

Powell, Nick, "Comms milestone", The Antarctic Sun, pp. 5-6, Dec. 29, 2002.

* cited by examiner

*Primary Examiner* — Joseph Lauture
(74) *Attorney, Agent, or Firm* — Weaver Austin Villeneuve & Sampson LLP (57) ABSTRACT

High data rata communications services are provided via a satellite system. Data is received from a user at a data rate greater than 30 Mbps over a communications link between the user and a first satellite, where the first satellite is one of a number of satellites within the satellite system; the data is forwarded over a crosslink from the first satellite to at least a second satellite within the satellite system; and the data is forwarded from the second satellite by a feeder link to a gateway located on the earth, said gateway being communicatively coupled to a terrestrial data network. The data is received from the user terminal by an antenna on the first satellite adapted for operation at a frequency associated with the feeder link.

37 Claims, 7 Drawing Sheets

Prior Art

SATELLITE SYSTEM WITH ENHANCED PAYLOAD CAPACITY

TECHNICAL FIELD

This invention pertains to the field of satellite communications networks, and more particularly to the provision of a high data rate user link capability by way of a global mobile satellite system.

BACKGROUND OF THE INVENTION

The assignee of the present invention manufactures and deploys communications satellites. A large number of such satellites have been employed in varying orbits for a variety of missions, including point to point communications of voice and/or data. A system of such satellites providing communications service to mobile users on a substantially worldwide basis is termed a Global Mobile Satellite System (GMSS). Examples of deployed or proposed GMSS's include Globalstar, ICO, Inmarsat, Iridium, Orbcomm, and Teledesic.

GMSS's have been proposed and deployed for use in both low earth orbit (LEO) and geostationary orbit (GSO). Satellites in GSO operate at an orbital altitude approximately forty-five times higher than a typical LEO altitude; as a result, for a given desired data rate, a communications link between a GSO satellite and a terrestrial user requires higher power and/or a larger antenna than a communications link between a spacecraft in LEO and a terrestrial user. A GSO satellite operates over the earth's equator, and can provide only limited coverage to regions at latitudes substantially higher than 70 degrees. However, a GSO satellite is substantially stationary relative to any point on the earth's surface, and may provide communications coverage to an area representing as much as 40% of the earth's surface, whereas each single spacecraft in LEO is able to service only a much smaller geographic footprint, and has a substantial motion with respect to any point on the ground.

Taking into account a perceived market need for telephone and low data rate service for mobile users in locations underserved by terrestrial cellular telephone services, presently operating LEO GMSS's such as Iridium and Globalstar, and GSO GMSS's such as Inmarsat, were deployed to provide such services. Adequate voice service, and low data rate data services, typically less than 5 Mbps, are available to subscribers over these services.

Figure 1:
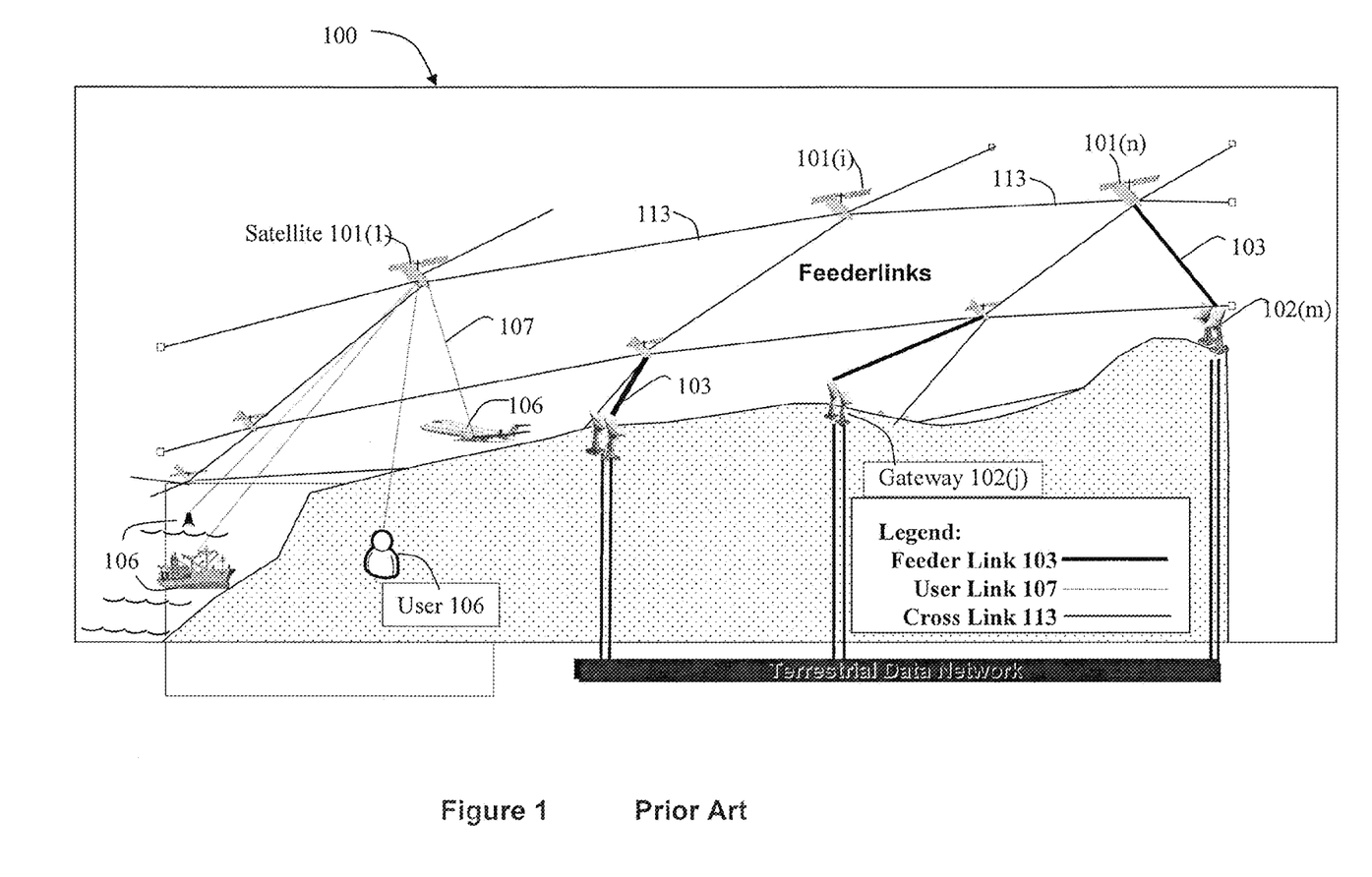
FIG. 1 illustrates a system level diagram of an exemplary communications network of the prior art.

A typical GMSS 100 is illustrated in simplified form in FIG. 1. The system includes a network of satellites 101(1)-101(n). Each satellite 101(i) is communicatively coupled, either directly or by way of one or more crosslinks 113, to at least one terrestrial gateway 102 and a plurality of user terminals 106. The user terminals 106 comprise satellite terminals that may be handheld mobile telephones or car phones, or terminals installed on mobile and/or remote platforms such as ships, aircraft, buoys, and the like. The satellites making up the GMSS 100 may be in LEO or GSO, as an example, but may also operate in medium earth orbit (MEO), highly inclined elliptical orbits (HIEO), or some combination of all or some of these orbits or other earth orbits so as to provide substantially global coverage.

A terrestrial gateway 102 communicates with a satellite 101 over a feeder link 103; a user terminal 106 and a satellite 101 communicate over a user link 107. Traffic generated by a subscriber 106 may be routed from satellite 101(1) in view of subscriber 106 to a satellite 101(n) in view of gateway 102(m) by way of one or more crosslinks 113. Communications traffic initially received by multiple satellites 101 may be delivered via one or more crosslinks 113 to satellite 101(n), which may downlink the traffic to gateway 102(m) over a feeder link 103. Outbound traffic to a user 106 as well as command and control communications can follow the opposite path: gateway 102(m) may uplink the traffic to satellite 101(n) over feeder link 103, and satellite 101(n) may forward the traffic to the user 106 and one or more other satellites 101(i) via one or more crosslinks 113.

A GMSS 100 provides low data rate services, as well as voice services, for users over user link 107. User link 107 conventionally operates at a relatively low frequency, for example in the L-band. Feeder link 103, on the other hand, is conventionally operated at a relatively high frequency, for example in the Ka-Band.

Figure 2A:
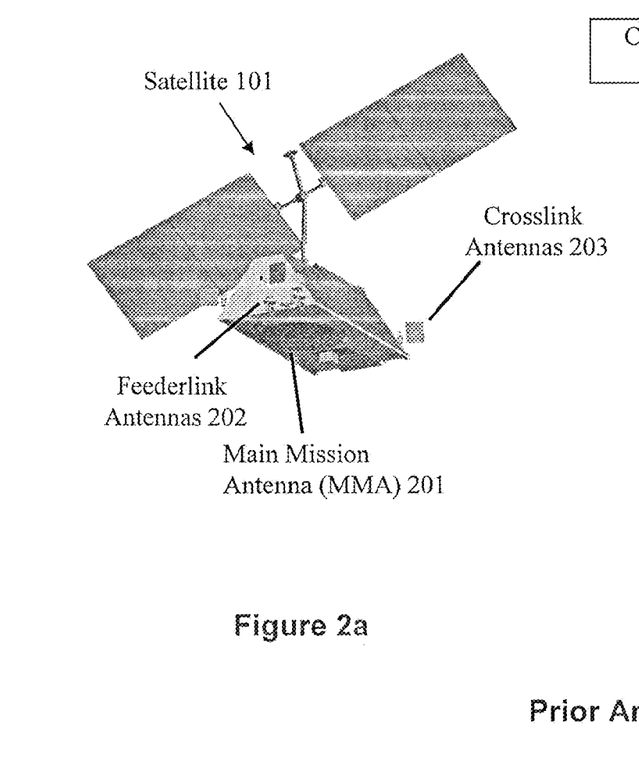
FIGS. 2*a* and 2*b* illustrates components of a satellite 101 of the prior art.
Figure 2B:
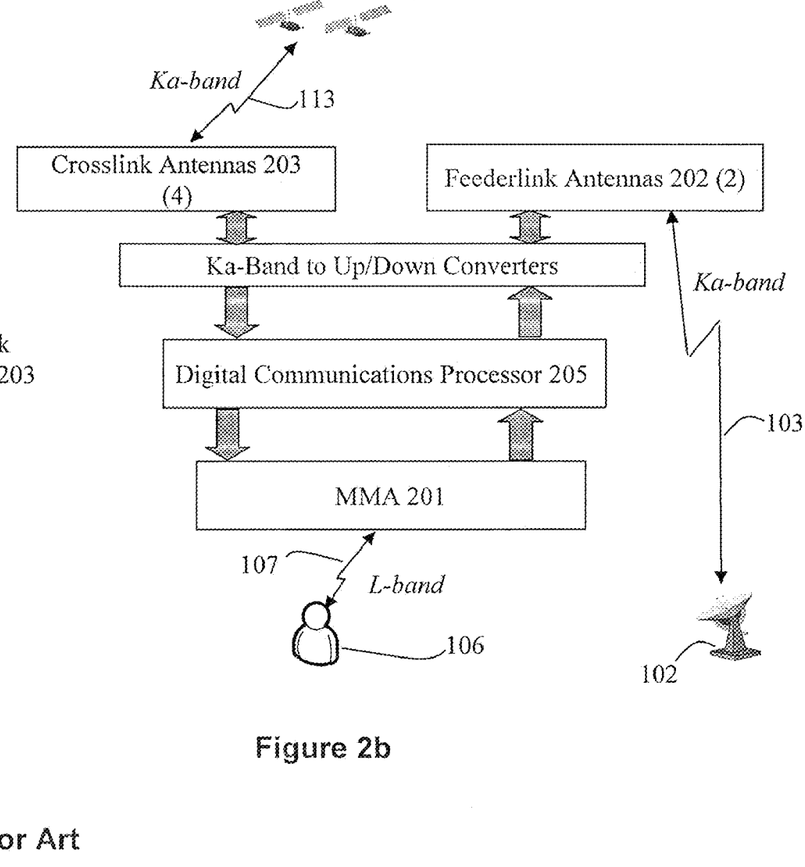

Corresponding to the above-described system architecture, and referring now to FIGS. 2a and 2b, each satellite 101 includes an earth pointing main mission antenna (MMA) 201, operable (at L-band, for example) to complete user link 107; a feeder link antenna 202 operable (at Ka-band, for example) to complete feeder link 103; and a crosslink antenna 203 operable (also at Ka-band, for example) to complete cross link 113. MMA 201 may be communicatively coupled at a low data rate (e.g., <5 Mbps) to one or more user terminals 106. Received communications traffic is processed onboard by digital communications processor 205 and routed according to the intended destination of the traffic.

DISCLOSURE OF INVENTION

The present inventors have developed techniques to cure a significant deficiency in the prior art described above, specifically the failure of GMSS to provide high data rate service to users (defined herein and in the claims as a user link data rate greater than 30 Mbps).

There is a substantial unmet need for providing high data rate user links via a GMSS. For example, desired data return from high data rate sources such as remotely controlled Unmanned Aeronautical Vehicles (UAVs) can reach or exceed 274 Mbps. In the absence of the presently described methods and systems, and given practical constraints on antenna and power system capabilities of a UAV, no present satellite system can handle such data rates without imposing severe data compression or service constraints. The Predator UAV, for example, is limited, even while using an antenna larger than 1 meter, to data transmission rates less than 50 Mbps via Ku-band communications to a GSO data relay satellite, notwithstanding that the UAV is capable of collecting data at a much higher rate.

Another important unmet demand results from increasing scientific activity at polar research stations, including research critical to an improved understanding of climate change. These activities are generating data at a rate far in excess of the capability of the existing communications infrastructure to handle in real time. For example, a data rate requirement of the scientific community at the South Pole Research Station in Antarctica is approximately 1 terabyte per day (90 Mbps). Existing communications infrastructure using geosynchronous satellites and the Iridium satellite system provides less than 2 Mbps for less than 12 hours per day.

The foregoing unmet needs for higher data rate user links may be serviced, and the payload capacity of a satellite system 100 enhanced, by using existing spacecraft feeder link antennas 202 and corresponding payload electronics to complete user links 107, while minimizing other changes to the system. For example, a method embodiment provides high data rata communications services via a satellite system 100 by: (a) receiving data from a user 106 at a data rate greater than 30 Mbps over a user link 107 between user 106 and a first satellite 101(*i*); (b) forwarding the data over a crosslink 113 from first satellite 101(1) to at least a second satellite 101(*i*) within the satellite system 100; and (b) forwarding the data from the second satellite 101(*i*) to a terrestrial gateway 102, where gateway 102 is communicatively coupled to a terrestrial data network. In an embodiment, data from user 106 may be received at satellite 101(*i*) by an antenna 202, where the antenna 202 is adapted for operation at a frequency associated with a feeder link of the satellite system. In some embodiments, the high data rate communications service may be provided to a user configured as an unmanned aeronautical vehicle (UAV) or located at a latitude greater than 75 degrees.

BRIEF DESCRIPTION OF THE DRAWINGS

Features of the invention are more fully disclosed in the following detailed description of the preferred embodiments, reference being had to the accompanying drawings, in which.

Throughout the drawings, the same reference numerals and characters, unless otherwise stated, are used to denote like features, elements, components, or portions of the illustrated embodiments. Moreover, while the subject invention will now be described in detail with reference to the drawings, the description is done in connection with the illustrative embodiments. It is intended that changes and modifications can be made to the described embodiments without departing from the true scope and spirit of the subject invention as defined by the appended claims.

DETAILED DESCRIPTION OF THE PREFERRED EMBODIMENTS

Specific exemplary embodiments of the invention will now be described with reference to the accompanying drawings. This invention may, however, be embodied in many different forms, and should not be construed as limited to the embodiments set forth herein. Rather, these embodiments are provided so that this disclosure will be thorough and complete, and will fully convey the scope of the invention to those skilled in the art. It will be understood that when an element is referred to as being "connected" or "coupled" to another element, it can be directly connected or coupled to the other element, or intervening elements may be present. Furthermore, "connected" or "coupled" as used herein may include wirelessly connected or coupled.

The overall design and operation of spacecraft communications networks are well known to those having skill in the art, and need not be described further herein. As disclosed herein, a user terminal 106 is adapted for communication with a satellite 101, and may be one of a plurality of different types of fixed and mobile user terminals including, but not limited to, a cellular telephone, wireless handset, a wireless modem, a data transceiver, a paging or position determination receiver, or a mobile radio-telephone. Furthermore, a user terminal may be hand-held, portable as in vehicle-mounted (including for example cars, trucks, boats, trains, and planes), or fixed, as desired. A user terminal 106 may be referred to as a wireless communication device, a mobile station, a mobile unit, a subscriber unit, a mobile radio or radiotelephone, a wireless unit, or simply as a "user," a "subscriber," or a "mobile" in some communication systems. Furthermore, as used herein, the term "spacecraft" 101 includes one or more satellites at any orbit (geostationary, substantially geostationary, inclined geosynchronous, Molniya, medium earth orbit, low earth orbit, and other non-geostationary orbits) and/or one or more other spacecraft that has/have a trajectory above the earth or other celestial body at any altitude.

It will be understood that although the terms "first" and "second" are used herein to describe various elements, these elements should not be limited by these terms. These terms are used only to distinguish one element from another element. Thus, for example, a first user terminal could be termed a second user terminal, and similarly, a second user terminal may be termed a first user terminal without departing from the teachings of the present invention. As used herein, the term "and/or" includes any and all combinations of one or more of the associated listed items. The symbol "/" is also used as a shorthand notation for "and/or".

A method embodiment of the present invention provides high data rata communications services via a global mobile satellite system (GMSS) 100 by: (a) receiving data from a user 106 with an antenna 202 on a first satellite 101(*i*) over a user link 107 between user 106 and a first satellite 101(*i*); (b) forwarding the data over a crosslink 113 from first satellite 101(*i*) to at least a second satellite 101(*j*) within the GMSS 100; and (c) forwarding the data from second satellite 101(*j*) by a feeder link 103 to a terrestrial gateway 102, where antenna 202 adapted for operation at a frequency associated with the feeder link.

In a further embodiment of the present invention, the data is received from user 106 by feeder link antenna 202 on a first satellite 101(*i*). Antenna 202 may be adapted for operation at a frequency associated with feeder link 103 (e.g., for operation at Ka band).

Certain advantageous features of this method will now be elaborated.

In the case of an existing GMSS such as Iridium, the communications capacities of GMSS 100 and any individual satellite 101(*i*) in the GMSS 100 are specified with reference to a conventional mission traffic model based on low data rate user links for telephony voice, directed messaging, voice messaging, short burst data, and other subscriber low data rate services. The GMSS resources needed to support these conventional mission services vary with type of service, subscriber unit locations, time of day, duration, quality of service, bit rate, satellite power availability, and other relevant parameters. For example, Ka-band feeder links 103 and crosslinks 113 supported by respective antennas and payload electronics on each satellite 101(*i*) are designed to transport the voice and data service capacity resulting from the specified L-band user link mission's maximum traffic requirements, as well as support the telemetry, tracking, command, and control communications needs of the GMSS 100.

Because the communications payloads supporting feeder link 103 and crosslink 113 are sized for a defined maximum communications traffic requirement, they are, in practice, often underutilized during much of any mission day over the long lifetime of GMSS 100. For example, the feeder link antenna 202 and corresponding payload electronics on any one individual satellite are conventionally active only when in view of a gateway 102(j). On the average, for a GMSS 100 such as Iridium, consisting of sixty six satellites, feeder link 103 is used only 1/66 of the time for each gateway 102, or less than 22 minutes per day per gateway. When satellite 101 is not in sight of a gateway 102, the communications payload supported by feeder link antenna 202 represents an untapped source of potential revenue for an operator of the GMSS 100.

The present inventors have recognized that a high data rate user uplink service may be implemented at very little additional cost to the development and operation of the GMSS 100 when the satellite's existing feeder link antenna 202 and corresponding payload electronics are used for the service. This existing equipment may be used in communications with a high data rate user when the satellite is not in view of a gateway or is not operating at maximum capacity. The service thereby provided can serve new subscribers, operating at high data rates, previously unreachable by the conventional GMSS user links.

For example, a conventional GMSS mission may provide a voice service (<10 Kbps each) and low data rate service (<5 Mbps each) to multiple users over a user link 107 at L-band, and may have a total per-satellite user link data rate equivalent to less than 30 Mbps. This traffic may then be routed by a network of Ka-band crosslinks 113 to one or more of the satellites in view of a gateway 102 where the traffic is downlinked to gateway 102 using a feeder link 103 at Ka-band. However, the feeder link 103 and crosslink 113 are required to handle data rates a factor of ten or more higher than a single satellite's normal user link load of 30 Mbps. For example, each satellite's feeder link antenna 202 and digital communications processor 205 may have a load capacity equivalent to 1.1 Gbps. Moreover, each of the satellite's plurality of crosslink communications connections may have a load capacity equivalent to 0.6 Gbps.

Figure 3:
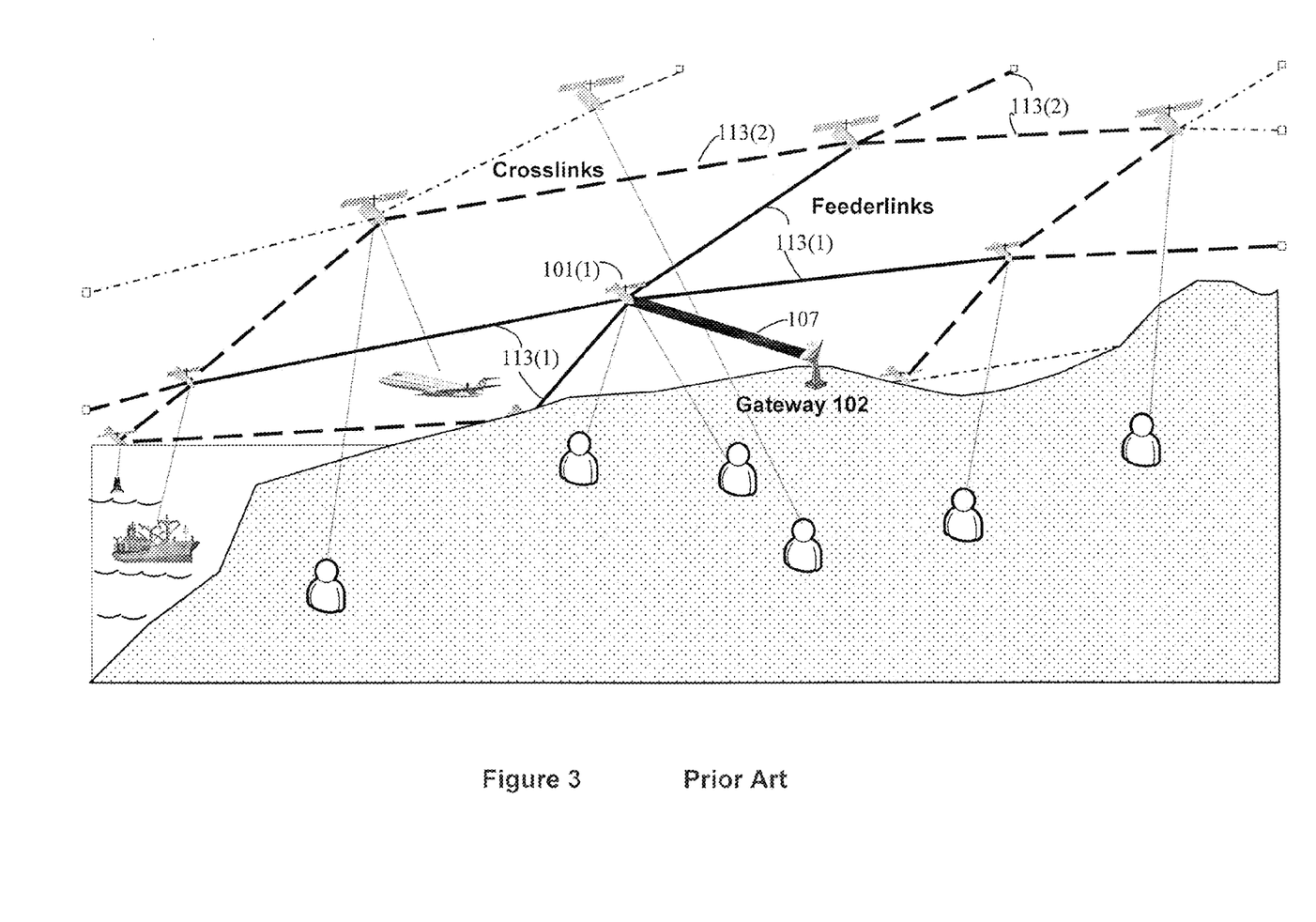
FIG. 3 illustrates features of satellite cross links 113 in accordance with the prior art.

As illustrated in FIG. 3, this relative oversizing of the crosslink and feeder link payload capacities is necessitated by the fact that a single satellite 101(1) in direct communications with a gateway 102 must be capable of transiting data from a substantial number of other satellites in the GMSS 100 that are not in direct communications with the gateway 102. Accordingly, for example, the data rate associated with feeder link 107 must accommodate the data received at satellite 101(1) over each of four crosslinks 113(1); likewise, the data rate of crosslink 113(1) received from satellite 101(2) must be sufficient to accommodate the data received by satellite 101(2) over each of three crosslinks 113(2). Thus, it is evident that the feeder link antenna 202 and crosslink antennas 203 and corresponding payload electronics must support substantially higher data rate capabilities than the conventional user link payload.

Figure 5:
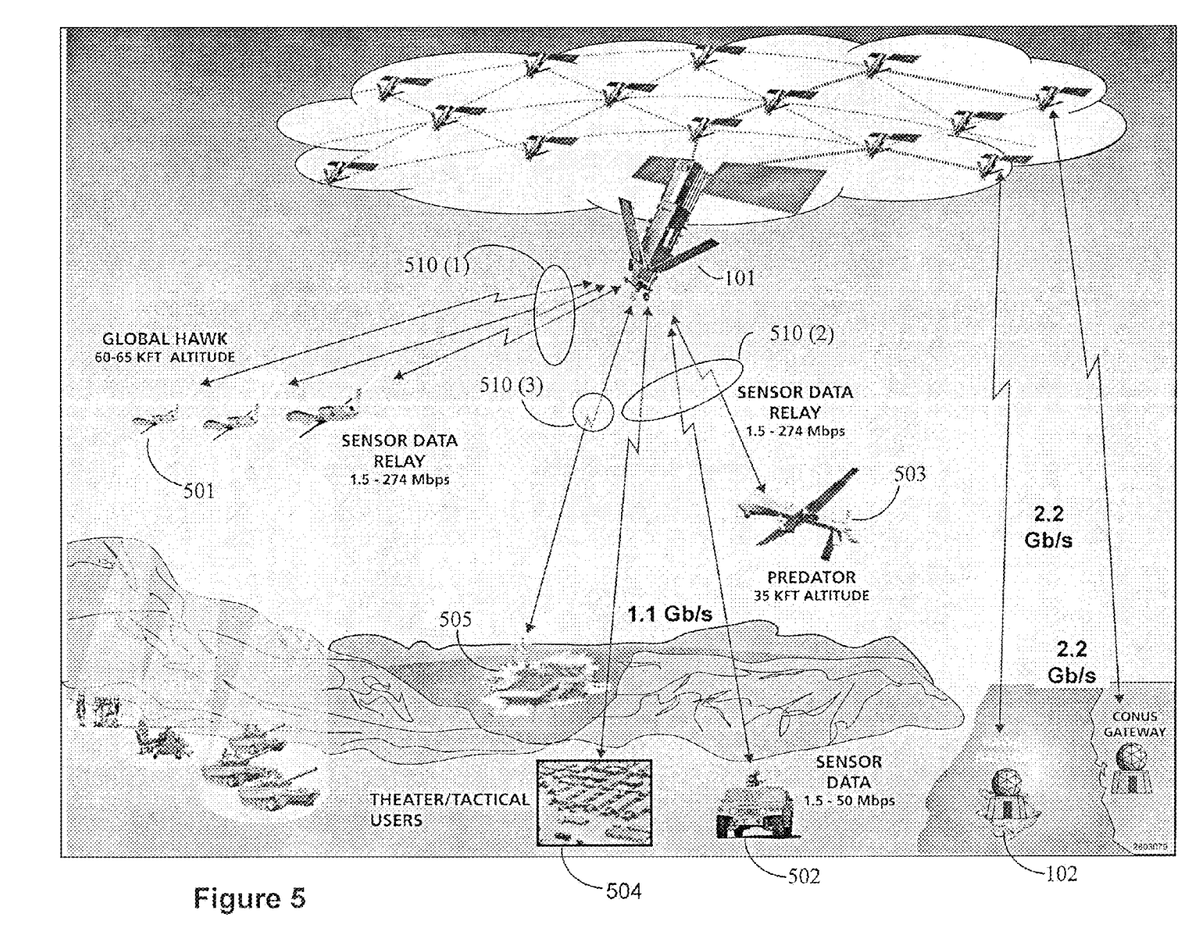
FIG. 5 illustrates architectural features and functions of an embodiment of the present invention.

The present inventors have recognized ways to take advantage of this inherent overcapacity. When a satellite 101(i) in the GMSS 100 passes over a theater of operations of one or more subscribers having high data rate (30 Mbps to 1 Gbps) or medium data rate requirements (5 to 30 Mbps), such subscribers may establish contact with satellite 101(i) at a frequency associated with feeder link 103 via the conventionally underused feeder link antenna 202. Referring now to FIG. 5, such high data rate subscribers may take the form of one or more Unmanned Aeronautical Vehicles (UAVs) 501 operating at Ka-band frequencies, each generating data at high rates, for example of 274 Mbps or more. Medium data rate assets 502 in the theater may also establish data connections within a common spot beam illuminated by feeder link antenna 202 until reaching, for example, the 1.1 Gbps maximum capacity of feeder link antenna 202. Two crosslinks, for example, each operating at a maximum capability of 0.55 Gbps, may transport this total maximum traffic a satellite 101(n) in view of a gateway 102 where the traffic may be downlinked.

FIG. 5 also illustrates an augmented data return and dissemination architecture for application in a theater of operations that includes multiple UAVs generating sensor data at high rates. Satellite 101, while performing its conventional low data rate mission through MMA 201, may have an additional complement of feeder link antennas and corresponding payload electronics not required for gateway 102 communications. In an embodiment, user terminals 106 located on multiple subscriber UAVs 501 flying in formation may be in communication with a first feeder link antenna 202. A single feeder link beam 510(1) of approximately 30 km diameter at the sub-satellite point to 90 km width at the edge of the coverage area may be designed to support 1.1 Gbps at worst case ranges in this example. Three UAVs 501 each generating 274 Mbps may be supported by feeder link beam 510(1). A second feeder link antenna 202 may generate a beam 510(2) that supports an additional subscriber UAV 503 plus sensor data from a mobile subscriber 502 while returning 1.1 Gbps of data back in-theater to tactical users 504. A third feeder link antenna 202 may generate beam 510(3) that supports a ship-based ISU 505. All or part of the data generated in this theater of operations may be transported back to a secure gateway 102 in Hawaii and/or in the continental United States via crosslinks 113. In this example, four crosslink antennas may be manifested on each satellite 101 in the global constellation, allowing four separate return paths, each handling up to 600 Mbps of traffic.

Figure 4:
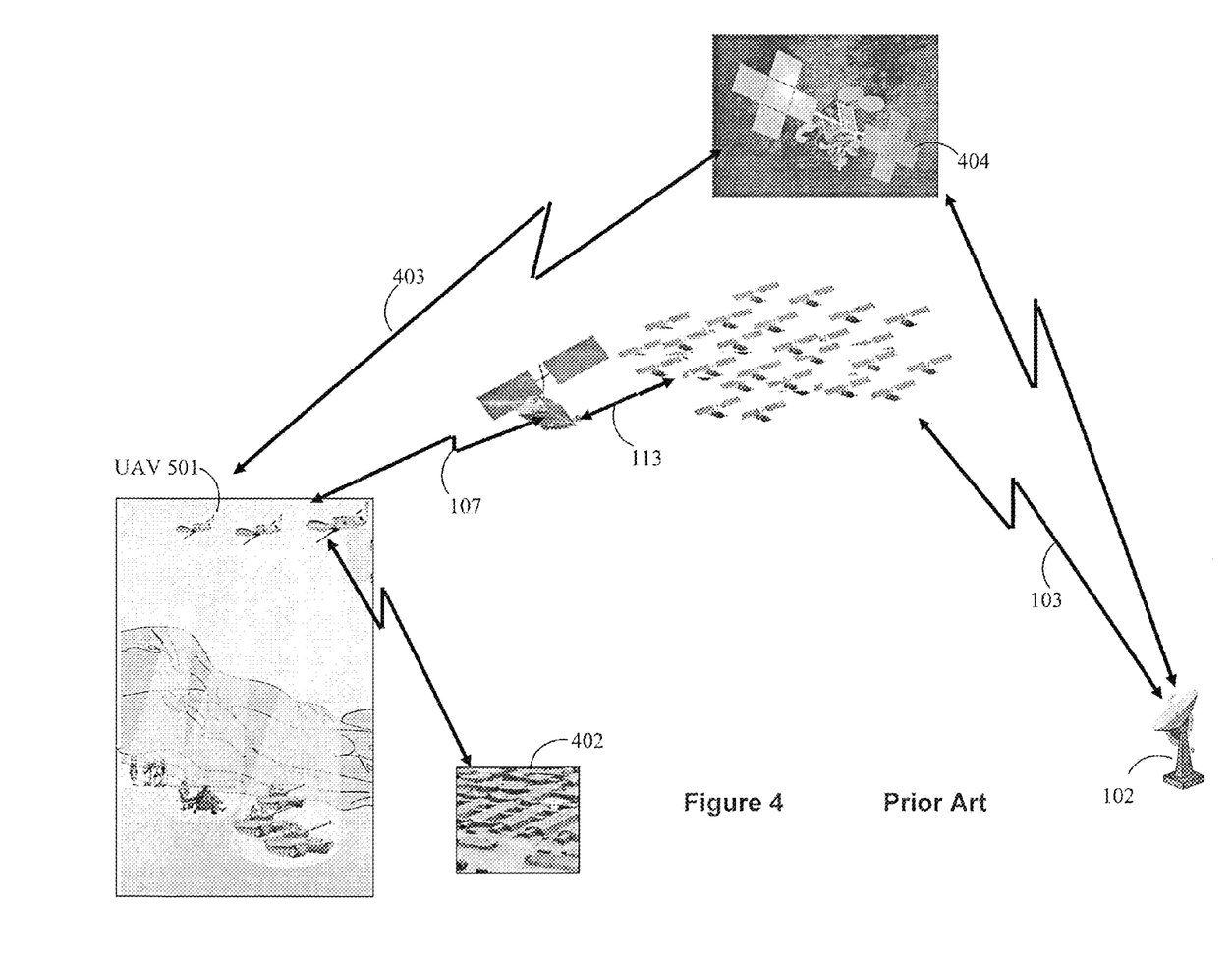
FIG. 4 illustrates an operational scenario associated with the prior art.

Referring now to FIG. 4, an important benefit of the presently disclosed methods should be noted. Because UAV's 501 such as the Predator and Global Hawk generate mission data far in excess of the conventional GMSS capacities, operators of such assets constrained by the conventional GMSS capacities are often required to command and control UAV 501 and receive the sensor data directly from a ground control station 402 in view of UAV 501. This approach may pose significant logistical costs, security risks, and personnel hazards. Alternatively, a UAV 501 may send data and receive command and control signals through GSO user links 403 with a GSO satellite 404. However, the data rate of such links are also limited to rates (e.g., approximately 50 Mbps) that are well below the data collection rate of UAV 501. Even with a relatively large UAV antenna and high power, it is necessary to employ data compression processing techniques and lowered sensor resolution to receive data from UAV 401. In accordance with the existing art, a LEO GMSS such as Iridium provides UAV 501 communications capability only as a backup system for remote command and control. Sensor data is not transmitted over Iridium, because of Iridium's conventionally low data rate capability. These limitations of Iridium and GSO alternatives to Iridium may be overcome using embodiments described hereinabove, thereby providing substantial benefits to an important class of user, while reducing risks to personnel and data security. The present inventors have found that UAV's and other user terminals are operable at high data rates using the methods disclosed herein even with relatively low transmitter output powers less than 50 watts and/or antenna aperture sizes less than 1.3 meters.

In a further embodiment, data return from polar scientific research stations is facilitated. As discussed above, the volume of data collected by such stations may approach one terabyte per day of data. Because the Polar Regions have limited visibility of a GSO satellite, a dedicated relay satellite in a special orbit has been proposed for polar data return missions. But the present inventors have found that embodiments of the GMSS 100 described above offer a better and less expensive solution for these missions. For example, in an embodiment, a single plane of enhanced near-polar orbiting satellites can return the desired data from a polar region, via a path from subscriber 106 to feeder link antenna 202 of satellite 101(i); then by crosslink 113 to satellite 101(n) (either directly or via multiple crosslink hops); then by feeder link antenna 202 of satellite 101(n) to gateway 102. Thus, a need for a dedicated relay satellite for this mission may be avoided.

Figure 6:
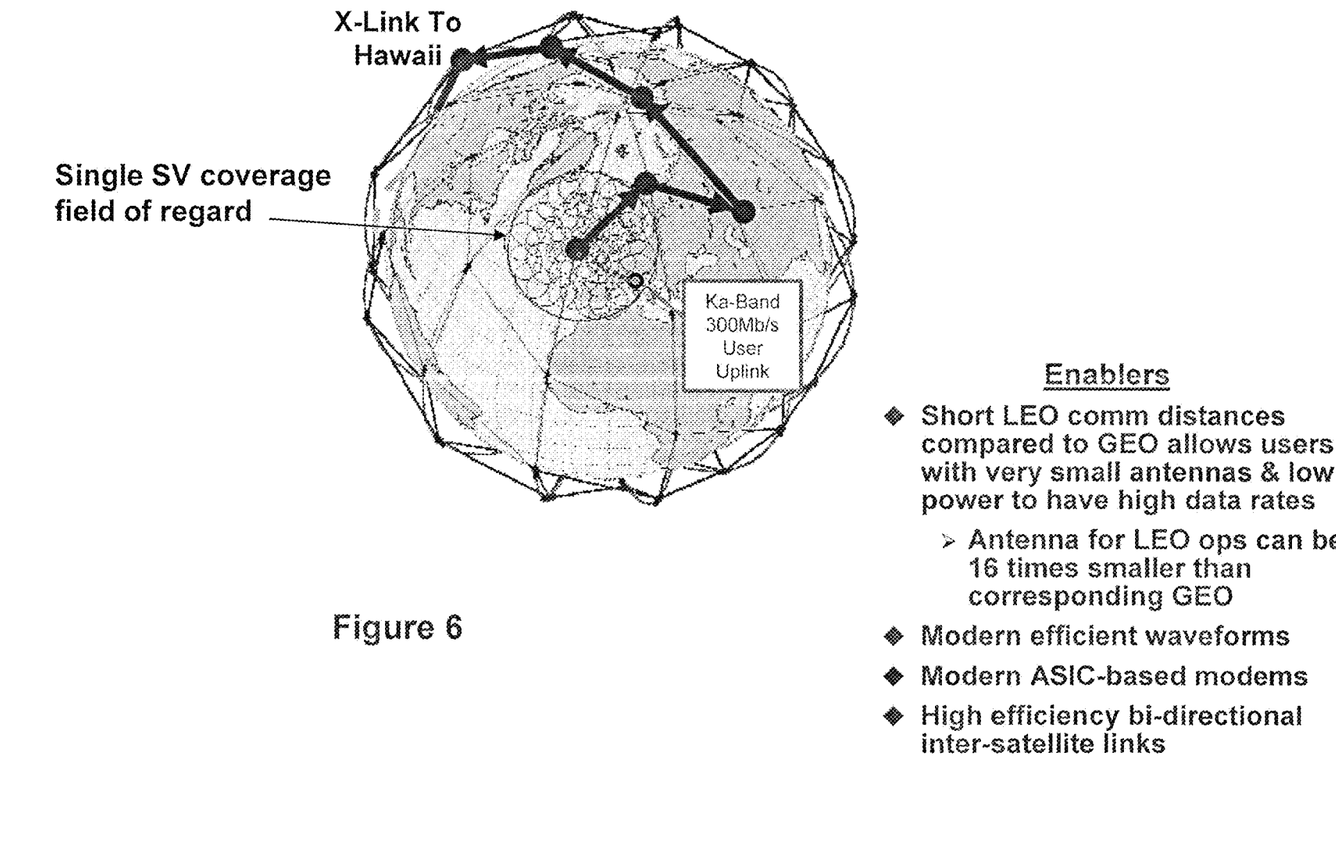
FIG. 6 illustrates an operational scenario of an embodiment of the present invention.

The presently disclosed embodiments may provide high-speed data transport capability for a given GMSS. In some embodiments, the GMSS operates in LEO, providing an advantageous reduction in user terminal size compared to a GSO system (e.g., up to 16× reduction in antenna aperture). For example, a LEO satellite 101 not in view of a gateway 102 may receive data from a user 106 over a Ka band user link 107 at a rate of approximately 300 Mbps, using feeder link antenna 202. User 106 may be, for example, a UAV 501. Once the communications link is established, feeder link antenna 202 may track a computed location of UAV 501 relative to the satellite. UAV 501 may track the satellite 101 based on a computed ephemeris as the satellite 101 travels overhead. As illustrated in FIG. 6, received data may then be cross linked over multiple hops, both between and within orbital planes, until it may be downlinked over feeder link 103 to a secure gateway 102 in U.S. territory. Each link is bidirectional, so command and control of UAV 501 and any messages or data return is handled by the same links.

Figure 7:
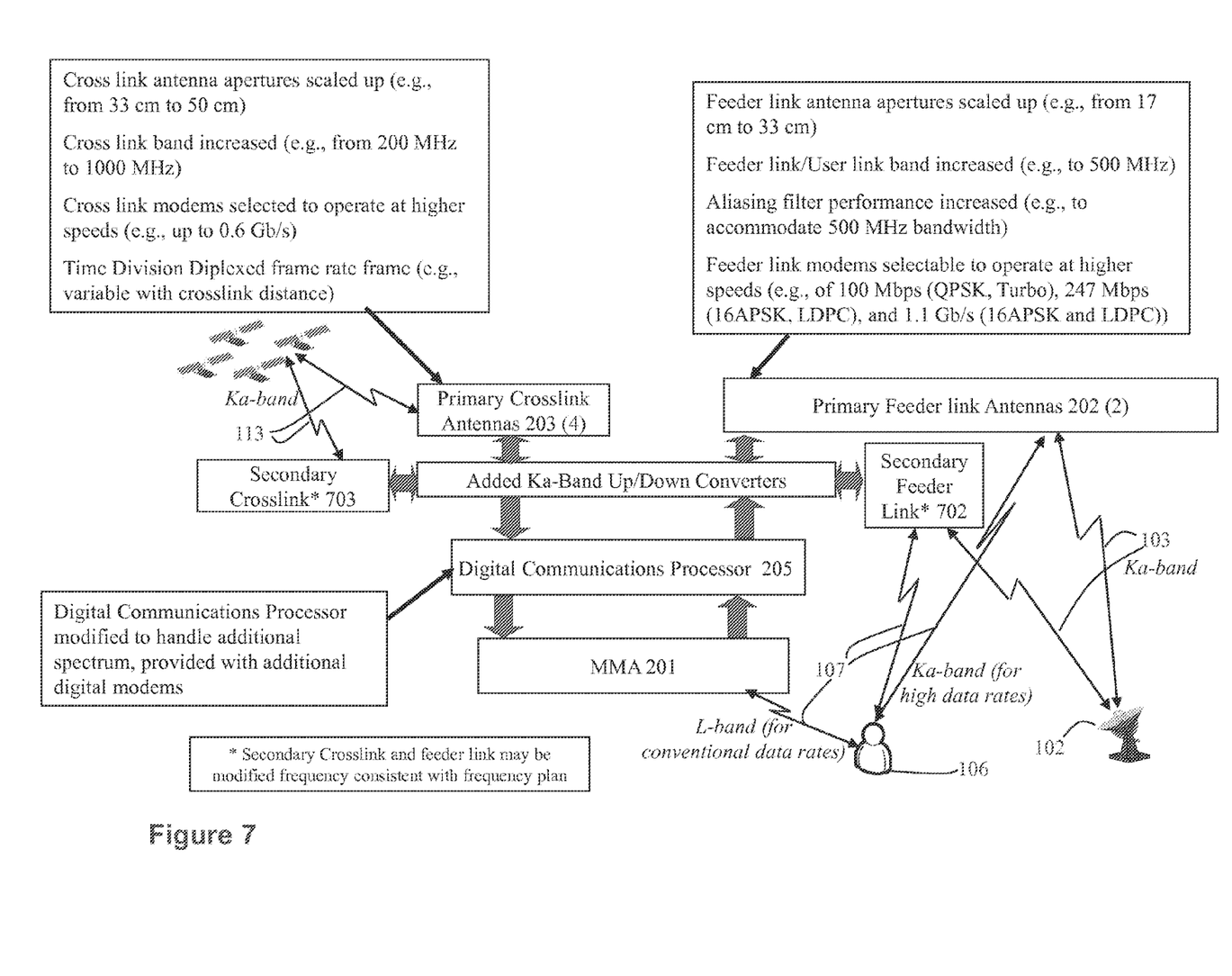
FIG. 7 illustrates a block diagram of a satellite according to an embodiment of the present invention.

Referring now to FIG. 7, payload improvements that may be advantageously used in certain embodiments to support high-speed user link data transport are disclosed. For example, digital communications processor 205 may be improved by implementing advanced forward error correction techniques such as Low Density Parity Check (LDPC) to improve link performance. A second improvement is the implementation of advanced quality of service techniques such as gain control, adaptive resending request control methods (ARQ), and/or rate adaptation to improve link performance. Crosslink data rates may also be improved by scaling up antenna apertures (or otherwise increasing effective isotropically radiated power and G/T), increasing bandwidth, and implementing higher speed modems. More crosslinks may be employed to connect more satellites in view. Each feeder link may be improved with larger antennas, increased bandwidth, increased filter performance, and/or higher speed modems with more efficient coding. Additional feeder link antennas may be added to increase the number of spot beams in any satellite coverage area and therefore increase the number of high-speed Subscribers (such as UAVs) serviced. Any or all of these improvements may be used in combination to improve the crosslink and feeder link capacities and data rate capabilities.

Thus, a GMSS with enhanced payload capacity has been disclosed. Using the teachings of the present disclosure, substantial improvements to the data rates available from known space systems are achieved. As discussed hereinabove, an existing GMSS such as Iridium is limited to an approximately 30 Mbps user link data load per spacecraft. Even large, fixed earth terminals in communications with a GSO satellite over a typical 36 MHz transponder and using bandwidth efficient modulation cannot exceed data rates of approximately 100 Mbps. However, using the present teachings, a LEO GMSS may provide high data rates to users equipped with very small, low power user terminals. Furthermore, embodiments described herein provide substantially enhanced payload capacity; specifically, user link data capacity per spacecraft may be approximately 2.2 Gbps in some embodiments described herein.

The foregoing merely illustrates principles of the invention. It will thus be appreciated that those skilled in the art will be able to devise numerous systems and methods which, although not explicitly shown or described herein, embody said principles of the invention and are thus within the spirit and scope of the invention as defined by the following claims.

What is claimed is:

1. A method for enhancing a payload capacity of a satellite system, the method comprising:
   receiving data from a user over a communications link between the user and a first satellite, said first satellite being one of a plurality of satellites within the satellite system;
   forwarding said data over a crosslink from the first satellite to at least a second satellite within the satellite system; and
   forwarding said data from the second satellite by a first feeder link to a terrestrial gateway, said first feeder link operating within a feeder link frequency band, said gateway being communicatively coupled to a terrestrial data network, wherein
   the receiving step comprises receiving data from the user at a data rate greater than 30 Mbps by an antenna on the first satellite, said antenna being configured to:
   operate at a frequency within the feeder link frequency band;
   receive data from the user when in view of the user; and
   complete a second feeder link to the terrestrial gateway when in view of the terrestrial gateway.

2. The method of claim 1, wherein the data is received at a data rate greater than 100 Mbps.

3. The method of claim 1, wherein the user is an unmanned aeronautical vehicle (UAV).

4. The method of claim 1, wherein the user is located at a latitude greater than 75 degrees.

5. The method of claim 1, wherein forwarding said data from the second satellite to the gateway comprises transiting the data via at least a third satellite in a communications path between the second satellite and the gateway.

6. The method of claim 1, wherein the satellite system operates in low earth orbit.

7. The method of claim 1, wherein the feeder link frequency band is within Ka-band.

8. The method of claim 1 wherein each of the feeder link, and the crosslink is bidirectional.

9. The method of claim 1, wherein receiving data from the user comprises receiving data from a plurality of users at an aggregate data rate greater than 300 Mbps.

10. The method of claim 1, wherein receiving data from the user comprises receiving data from a plurality of users at an aggregate data rate greater than 1 Gbps.

11. A method for enhancing a payload capacity of a satellite system, the method comprising:
    receiving data from a user over a communications link between the user and a first satellite, said first satellite being one of a plurality of satellites within the satellite system;
    forwarding said data over a crosslink from the first satellite to at least a second satellite within the satellite system; and
    forwarding said data from the second satellite by a first feeder link to a terrestrial gateway, said first feeder operating within a feeder link frequency band, said gateway being communicatively coupled to a terrestrial data network, wherein
the receiving step comprises receiving data from the user at a data rate greater than 30 Mbps by a first antenna on the first satellite, said first antenna being configured to:
operate at a frequency-within the feeder link frequency band;
receive data from the user when in view of the user; and
a second antenna on the first satellite is configured to complete a second feeder link to the gateway when in view of the gateway.

12. A method for enhancing a payload capacity of a satellite system, the method comprising:
receiving data from a user over a communications link between the user and a first satellite, said first satellite being one of a plurality of satellites within the satellite system;
forwarding said data over a crosslink from the first satellite to at least a second satellite within the satellite system; and
forwarding said data from the second satellite by a feeder link to a terrestrial gateway, said gateway being communicatively coupled to a terrestrial data network, wherein
the data is received from the user at a data rate greater than 30 Mbps by an antenna on the first satellite, said antenna being configured to operate at a frequency associated with the feeder link, wherein the user comprises a user terminal with at least one of a transmitter output power less than 50 watts and an aperture size less than 1.3 meters.

13. A method for enhancing a payload capacity of a satellite system, the method comprising:
receiving data from a user over a communications link between the user and a first satellite, said first satellite being one of a plurality of satellites within the satellite system;
forwarding said data over a crosslink from the first satellite to at least a second satellite within the satellite system; and
forwarding said data from the second satellite by a first feeder link to a terrestrial gateway, said gateway being communicatively coupled to a terrestrial data network, wherein
the data is received from the user at a data rate greater than 30 Mbps by an antenna on the first satellite, said antenna being configured to operate at a frequency associated with the feeder link, wherein the satellite system comprises an improvement to a preselected baseline communications capacity of at least one satellite, said baseline communications capacity being preselected with reference to a mission traffic model based on a low data rate user link.

14. The method of claim 13, wherein the improvement comprises at least one of:
implementing advanced forward error correction techniques such as Low Density Parity Check (LDPC) to improve link performance;
implementing large file size transmissions to improve link performance;
implementing an advanced quality of service technique comprising at least one of gain control, an adaptive resending request control method (ARQ), and rate adaptation to improve link performance;
increasing a size of a crosslink antenna;
increasing a size of a feeder link antenna;
implementing multi-beam feeder link antennas;
adding at least one of an additional crosslink antenna and an additional feeder link antenna;
adding bandwidth to at least one of the crosslink and the feeder link;
implementing a more efficient waveform;
increasing effective isotropically radiated power; and
implementing at least one of an optical cross link and an optical feeder link.

15. The method of claim 13, wherein the data is received at a data rate greater than 100 Mbps.

16. The method of claim 13, wherein the user is an unmanned aeronautical vehicle (UAV).

17. The method of claim 13, wherein the user is located at a latitude greater than 75 degrees.

18. The method of claim 13, wherein forwarding said data from the second satellite to the gateway comprises transiting the data via at least a third satellite in a communications path between the second satellite and the gateway.

19. The method of claim 13, wherein the antenna is configured to complete a second feeder link to the gateway when in view of the gateway.

20. The method of claim 13, wherein the antenna is a first antenna configured to receive data from the user at the frequency associated with the feeder link when in view of the user, and a second antenna on the first satellite is configured to complete the feeder link to the gateway when in view of the gateway.

21. The method of claim 13, wherein the satellite system operates in low earth orbit.

22. The method of claim 13, wherein the frequency associated with the feeder link is within Ka-band.

23. The method of claim 13, wherein each of the feeder link, and crosslink is bidirectional.

24. The method of claim 13, wherein receiving data from the user comprises receiving data from a plurality of users at an aggregate data rate greater than 300 Mbps.

25. The method of claim 13, wherein receiving data from the user comprises receiving data from a plurality of users at an aggregate data rate greater than 1 Gbps.

26. A satellite system comprising:
a first satellite for receiving data from a user over a communications link between the user and the first satellite, said first satellite being one of a plurality of satellites within the satellite system and being configured to forward said data over a crosslink from the first satellite to at least a second satellite within the satellite system; and
said second satellite being configured to forward said data from the second satellite by a first feeder link, operating within a feeder link frequency band, to a terrestrial gateway, said gateway being communicatively coupled to a terrestrial data network, wherein
the first satellite receives data from the user at a data rate greater than 30 Mbps by an antenna on the first satellite, said antenna being configured to:
operate at a frequency within the feeder link frequency band;
receive data from the user when in view of the user; and
complete a second feeder link to the terrestrial gateway when in view of the terrestrial gateway.

27. The system of claim 26, wherein the data is received at a data rate greater than 100 Mbps.

28. The system of claim 26, wherein forwarding said data from the second satellite to the gateway comprises transiting the data via at least a third satellite in a communications path between the second satellite and the gateway.

29. The system of claim 26, wherein the satellite system operates in low earth orbit.

30. The system of claim 26, wherein receiving data from the user comprises receiving data from a plurality of users at an aggregate data rate greater than 300 Mbps.

31. The system of claim 26, wherein receiving data from the user comprises receiving data from a plurality of users at an aggregate data rate greater than 1 Gbps.

32. A satellite system comprising:
a first satellite for receiving data from a user over a communications link between the user and the first satellite, said first satellite being one of a plurality of satellites within the satellite system and being configured to forward said data over a crosslink from the first satellite to at least a second satellite within the satellite system; and
said second satellite being configured to forward said data from the second satellite by a first feeder link, operating within a feeder link frequency band, to a terrestrial gateway, said gateway being communicatively coupled to a terrestrial data network, wherein
the first satellite receives data from the user at a data rate greater than 30 Mbps by a first antenna on the first satellite, said first antenna being configured to operate at a frequency within the feeder link frequency band and receive data from the user when in view of the user; and
a second antenna on the first satellite is configured to complete a second feeder link to the gateway when in view of the gateway.

33. A satellite system comprising:
a first satellite for receiving data from a user over a communications link between the user and the first satellite, said first satellite being one of a plurality of satellites within the satellite system and being operable to forward said data over a crosslink from the first satellite to at least a second satellite within the satellite system; and
said second satellite being operable to forward said data from the second satellite by a feeder link to a terrestrial gateway, said gateway being communicatively coupled to a terrestrial data network, wherein the data is received from the user at a data rate greater than 30 Mbps by an antenna on the first satellite, said antenna being configured to operate at a frequency associated with the feeder link, wherein the user comprises a user terminal with at least one of a transmitter output power less than 50 watts and an aperture size less than 1.3 meters.

34. A satellite system comprising:
a first satellite for receiving data from a user over a communications link between the user and the first satellite, said first satellite being one of a plurality of satellites within the satellite system and being operable to forward said data over a crosslink from the first satellite to at least a second satellite within the satellite system; and
said second satellite being operable to forward said data from the second satellite by a feeder link to a terrestrial gateway, said gateway being communicatively coupled to a terrestrial data network, wherein the data is received from the user at a data rate greater than 30 Mbps by an antenna on the first satellite, said antenna being configured to operate at a frequency associated with the feeder link, wherein the satellite system comprises an improvement to a preselected baseline communications capacity of at least one satellite, said baseline communications capacity being preselected with reference to a mission traffic model based on a low data rate user link.

35. A satellite within a satellite system wherein:
said satellite is a first satellite configured to receive data from a user over a communications link between the user and the first satellite, said first satellite being one of a plurality of satellites within the satellite system and being configured to forward said data over a crosslink to at least a second satellite within the satellite system;
said second satellite is configured to forward said data from the second satellite by a first feeder link to a gateway, said first feeder link operating within a feeder link frequency band, said gateway being communicatively coupled to a terrestrial data network; and
the data is received from the user by an antenna on the first satellite, said antenna being configured to:
operate at a frequency within the feeder link frequency band;
receive data from the user when in view of the user; and
complete a second feeder link to the terrestrial gateway when in view of the terrestrial gateway.

36. A terrestrial gateway configured to communicate with a satellite system wherein:
a first satellite is configured to receive data from a user over a communications link between the user and the first satellite, said first satellite being one of a plurality of satellites within the satellite system and being configured to forward said data over a crosslink to at least a second satellite within the satellite system;
said second satellite is configured to forward said data from the second satellite by a first feeder link to the gateway, said gateway being communicatively coupled to a terrestrial data network; and
the data is received from the user by an antenna on the first satellite, said antenna being configured to operate at a frequency associated with the feeder link.

37. A user terminal configured to communicate with a satellite system wherein:
a first satellite is configured to receive data from the user terminal over a communications link between the user terminal and the first satellite, said first satellite being one of a plurality of satellites within the satellite system and being configured to forward said data over a crosslink to at least a second satellite within the satellite system;
said second satellite is configured to forward said data from the second satellite by a feeder link to the gateway said first feeder link operating within a feeder link frequency band, said gateway being communicatively coupled to a terrestrial data network; and
the data is received from the user terminal by an antenna on the first satellite, said antenna being configured to:
operate at a frequency within the feeder link frequency band;
receive data from the user when in view of the user; and
complete a second feeder link to the terrestrial gateway when in view of the terrestrial gateway.

* * * * *